United States Patent
Horikawa (10) Patent No.: US 12,407,956 B2
(45) Date of Patent: Sep. 2, 2025

(54) IMAGING DEVICE, IMAGING METHOD, AND STORAGE MEDIUM

(71) Applicant: CANON KABUSHIKI KAISHA, Tokyo (JP)

(72) Inventor: Yohei Horikawa, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 210 days.

(21) Appl. No.: 18/479,977

(22) Filed: Oct. 3, 2023

(65) Prior Publication Data
US 2024/0187757 A1    Jun. 6, 2024

(30) Foreign Application Priority Data

Oct. 21, 2022   (JP) ................................ 2022-169254

(51) Int. Cl.
*H04N 25/77*    (2023.01)
*H04N 23/11*    (2023.01)
*H04N 25/40*    (2023.01)
*H04N 25/707*   (2023.01)

(52) U.S. Cl.
CPC .......... *H04N 25/77* (2023.01); *H04N 25/707* (2023.01); *H04N 25/41* (2023.01)

(58) Field of Classification Search
CPC ...... H04N 25/77; H04N 25/707; H04N 25/41; H04N 23/11
See application file for complete search history.

(56) References Cited

U.S. PATENT DOCUMENTS

| | | | | |
|---|---|---|---|---|
| 11,423,524 B2* | 8/2022 | Numata | ................. | H04N 23/95 |
| 11,943,518 B2* | 3/2024 | Shigeta | ................. | H04N 23/88 |
| 12,302,004 B2* | 5/2025 | Okuike | ................. | H04N 23/95 |
| 2011/0169984 A1* | 7/2011 | Noguchi | ............. | H04N 25/131 |
| | | | | 348/234 |
| 2018/0336664 A1* | 11/2018 | Ono | ...................... | H04N 23/71 |
| 2021/0166361 A1* | 6/2021 | Fukishi | ................... | G06T 5/20 |
| 2022/0201183 A1 | 6/2022 | Okuike | | |
| 2025/0039557 A1* | 1/2025 | Ebata | ................... | H04N 23/745 |

FOREIGN PATENT DOCUMENTS

| | | |
|---|---|---|
| JP | 2002-027315 A | 1/2002 |
| JP | 2020-198470 A | 12/2020 |
| JP | 2021-132369 A | 9/2021 |

* cited by examiner

Primary Examiner — Marly S Camargo
(74) Attorney, Agent, or Firm — Cowan, Liebowitz & Latman, P.C.

(57) ABSTRACT

An imaging device comprises an imaging unit having a first pixel that photoelectrically converts visible light and a second pixel that photoelectrically converts non-visible light to generate an image signal, a composite image generation unit configured to generate a composite image signal by combining a plurality of the image signals, a first detection unit configured to detect a subject based on an output of the first pixel before the generation of the composite image signal is completed, a second detection unit configured to detect a subject based on an output of the second pixel before the generation of the composite image signal is completed, a third detection unit configured to perform subject detection using an output of either a visible light image or a non-visible light image included in the composite image signal based on an output of the first detection unit and an output of the second detection unit.

8 Claims, 11 Drawing Sheets

IMAGING DEVICE, IMAGING METHOD, AND STORAGE MEDIUM

BACKGROUND OF THE INVENTION

Field of the Invention

The present invention relates to an imaging device, an imaging method, a storage medium, and the like.

Description of the Related Art

A technique for recognizing a subject for focus detection is known in an imaging device represented by a digital camera. For example, Japanese Patent Application Laid-Open No. 2002-27315 discloses a camera system that extracts a feature amount of a subject from a multiple exposure image acquired by an imaging device and specifies the position of the subject in the multiple exposure image based on the extracted feature amount.

Japanese Patent Application Laid-Open No. 2020-198470 discloses a camera system that performs detection using an infrared image and detection based on a visible light image in order to improve the accuracy of subject recognition in a dark place. In recent years, a technique for performing such subject detection based on machine learning has been disclosed, but there is a problem that an increase in the number of types of subjects to be detected results in an increase in the number of types of dictionaries, and an increase in the amount of computation results in extension of a period of time until the distance of the position of a subject is measured.

In order to address such a problem, Japanese Patent Application Laid-Open No. 2021-132369 proposes a device that switches dictionary data of a subject to be detected in the next frame in accordance with the type of subject detected in a certain frame to be capable of stably detecting a subject while reducing the amount of processing.

However, in order to generate a multiple exposure image as disclosed in Japanese Patent Application Laid-Open No. 2002-27315, there is a problem that a processing time for a single exposure image signal is long. Furthermore, when machine learning is applied and detection based on dictionary data is applied to visible light and non-visible light, there is a problem that a circuit scale for performing detection processing becomes large or a detection time increases.

SUMMARY OF THE INVENTION

An imaging device according to an aspect of the present invention comprises an imaging unit having a first pixel that photoelectrically converts visible light and a second pixel that photoelectrically converts non-visible light to generate image signals,
at least one processor or circuit configured to function as:
a composite image generation unit configured to generate a composite image signal by combining a plurality of the image signals,
a first detection unit configured to detect a subject based on an output of the first pixel before the generation of the composite image signal is completed,
a second detection unit configured to detect a subject based on an output of the second pixel before the generation of the composite image signal is completed, and
a third detection unit configured to perform subject detection using an output of either a visible light image or a non-visible light image included in the composite image signal based on an output of the first detection unit and an output of the second detection unit.

Further features of the present invention will become apparent from the following description of embodiments with reference to the attached drawings.

DESCRIPTION OF THE EMBODIMENTS

Hereinafter, with reference to the accompanying drawings, favorable modes of the present invention will be described using embodiments. In each diagram, the same reference signs are applied to the same members or elements, and duplicate description will be omitted or simplified.

First Embodiment

Figure 1:
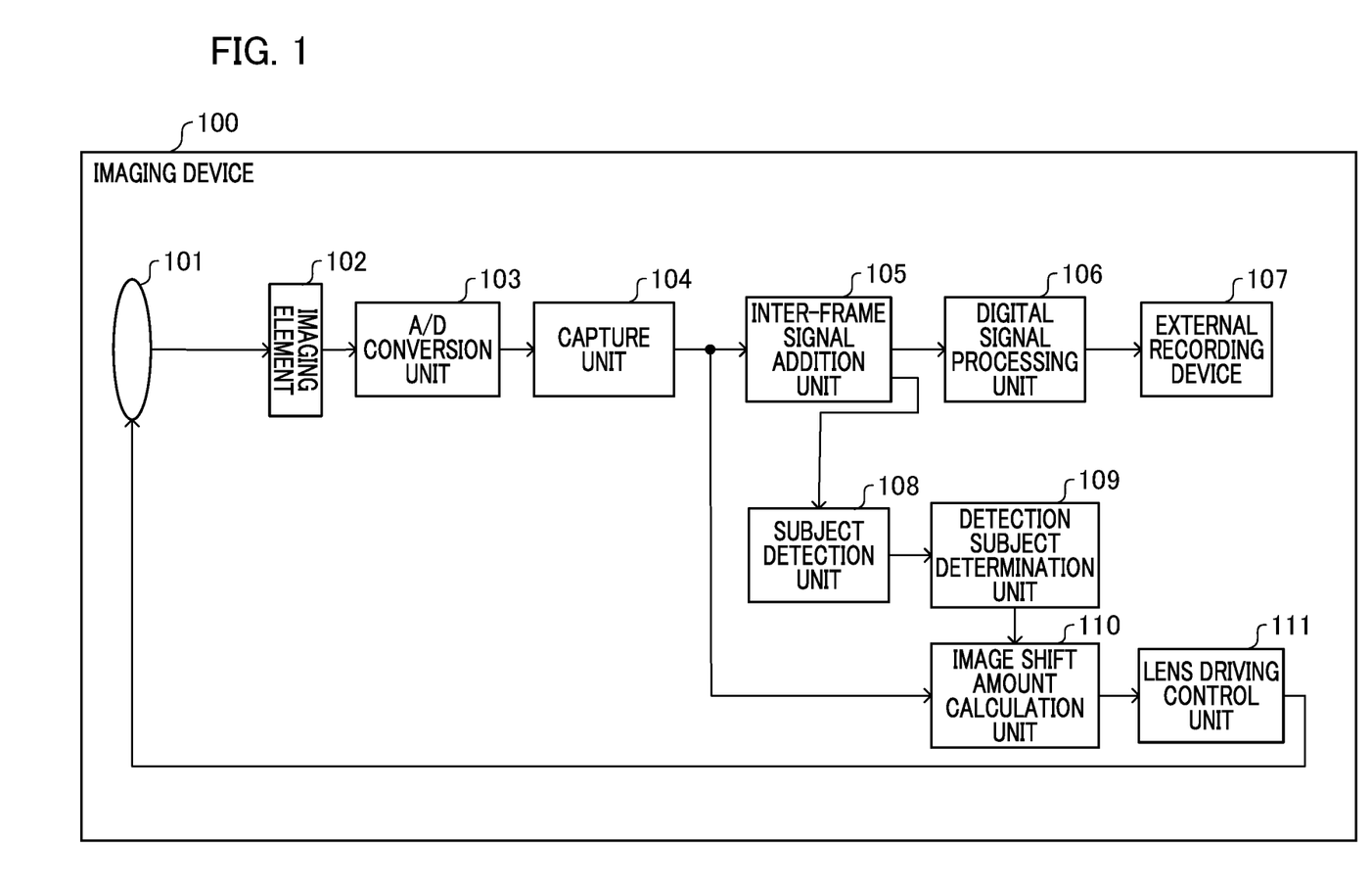
FIG. 1 is a functional block diagram illustrating a configuration example of an imaging device 100 according to a first embodiment of the present invention.

FIG. 1 is a functional block diagram illustrating a configuration example of an imaging device 100 according to a first embodiment of the present invention. Some of the functional blocks illustrated in FIG. 1 are realized by causing a computer, which is not illustrated in the drawing, included in the imaging device to execute a computer program stored in a memory, which is not illustrated in the drawing, as a storage medium.

However, some or all of these may be realized by hardware. As hardware, a dedicated circuit (ASIC), a processor (reconfigurable processor, DSP), or the like can be used. The functional blocks illustrated in FIG. 1 may not be built into the same housing, and may be constituted by separate devices connected to each other via signal paths.

Reference numeral 101 denotes an optical system unit that includes an optical lens group including a focusing lens for adjusting focus, a shutter, an aperture, a lens control unit, and the like. A movable portion in the optical system unit 101 is driven based on an output of a lens driving control unit 111, which will be described later.

The lens driving control unit 111 outputs a signal for driving the focusing lens included in the optical system unit 101 in accordance with an output of a defocus amount from an image shift amount calculation unit 110, which will be described later.

The imaging element 102 is an imaging element such as a CMOS image sensor in which unit pixel cells are arranged in a two-dimensional matrix and functions as an imaging unit that executes an imaging step of photoelectrically converting an image formed on a light receiving surface by the optical system unit to generate an image signal. Exposure control is performed by a shutter and a diaphragm member included in the optical system unit 101.

Figure 2A:
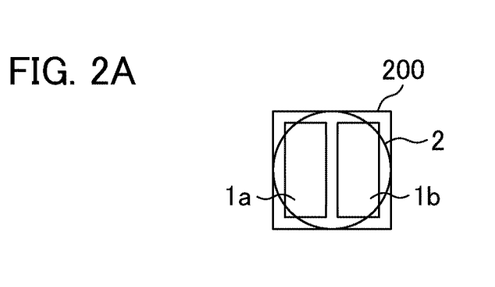
FIGS. 2A and 2B are a front view of a unit pixel cell of an imaging element 102 according to the first embodiment and a diagram illustrating a configuration in which the unit pixel cells are arranged two-dimensionally, respectively.
Figure 2B:
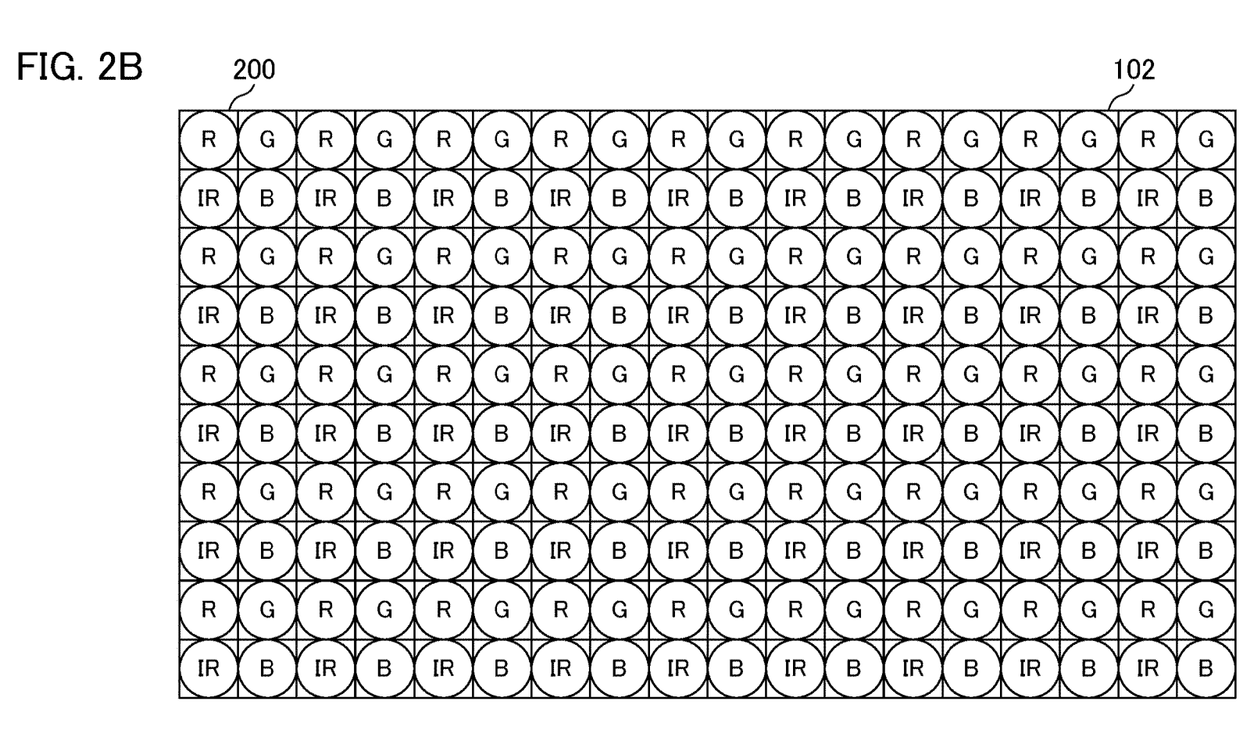

FIG. 2A is a front view (subject side) of a unit pixel cell of the imaging element 102 according to the first embodiment, and FIG. 2B is a diagram illustrating a configuration example in which the unit pixel cells are arranged two-dimensionally.

In FIG. 2, reference numeral 200 denotes each of the unit pixel cells, which are arranged two-dimensionally as illustrated in FIG. 2B. R, G, B, and IR (infrared) filters are periodically disposed on the front surfaces of the unit pixel cells 200 as illustrated in FIG. 2B.

As illustrated in FIG. 2A, the unit pixel cell 200 includes a microlens 2 and pixels 1a and 1b each including a photodiode (PD).

The pixels 1a and 1b are separate PDs that take in incident light through the same microlens 2, and the output of each PD receives pupil-divided light through the microlens 2, respectively. Images incident on a plurality of pixels 1a and 1b arranged in a horizontal scanning direction are hereinafter referred to as an A image and a B image, respectively.

As illustrated in FIG. 2B, in the imaging element 102, the unit pixel cells 200 having R (Red), G (Green), B (Blue), and IR (infrared) color filters arranged on the front surfaces thereof are disposed in a predetermined pattern. Specifically, R and G rows in which R and G are repeatedly disposed in the horizontal scanning direction, and IR and B rows in which IR (infrared light) and B are repeatedly disposed are repeatedly disposed in the vertical scanning direction.

An A/D conversion unit 103 performs analog signal processing on an analog electric signal output from the imaging element 102 by an analog signal processing unit, which is not illustrated in the drawing, converts it into a digital signal (pixel data), and outputs the converted digital signal to a capture unit 104. The analog signal processing unit is a CDS circuit, a non-linear amplifier circuit, or the like that removes noise on a transmission path.

The capture unit 104 determines an effective period and the type of pixel data, and outputs the pixel data of the A image and the B image to an inter-frame signal addition unit 105 and the image shift amount calculation unit 110.

The inter-frame signal addition unit 105 generates a frame image including a visible light image obtained by the unit pixel cells 200 corresponding to the R, G, and B color filters and a non-visible light image obtained by the unit pixel cells 200 corresponding to the IR filter.

Here, the unit pixel cells 200 corresponding to the R, G, and B color filters function as a first pixel that photoelectrically converts visible light. The unit pixel cells 200 corresponding to the IR filter function as a second pixel that photoelectrically converts non-visible light.

The frame image including the visible light image and the non-visible light image obtained by the unit pixel cells 200 is obtained by adding the pixel data of the A image and the B image obtained from the unit pixel cells 200 for each unit pixel cell 200.

Further, the inter-frame signal addition unit 105 adds the above-described frame image and frame images up to the previous frame stored in a volatile memory M, which is not illustrated in the drawing, such as a DRAM in units of pixel units, and outputs the sum image to a digital signal processing unit 106. The inter-frame signal addition unit 105 functions as a composite image generation unit that combines a plurality of image signals to generate a composite image signal.

In the first embodiment, an example in which a multiple exposure image is acquired by adding a plurality of frame images including visible light images and non-visible light images will be described. Such a multiple exposure image is generated, for example, when a subject is dark.

In this case, pixel data of a first frame for which multiple exposure has been instructed is stored in the volatile memory M. In a second frame, pixel data stored in the volatile memory M is read out, and pixel data output from the capture unit 104 is added and written back to the volatile memory M. The same operations are performed on a third frame and the subsequent frames. A final frame with which a predetermined number of frames have been reached is output to the digital signal processing unit 106 and a subject detection unit 108.

The digital signal processing unit 106 performs digital signal processing such as synchronization processing, gamma processing, and noise reduction processing. Image data having been subjected to the digital signal processing is converted into compressed image data such as JPEG, and is output to and recorded in an external recording device 107. By performing such processing, it is possible to obtain a multiple exposure image (data obtained by adding a plurality of frames of frame images including visible light images and non-visible light images).

The subject detection unit 108 sets dictionary data for the frame-added visible light image and non-visible light image output from the inter-frame signal addition unit 105 based on an instruction from a system control unit, which is not illustrated in the drawing, and performs subject detection. Detection information is added to the detected subject and output to a detection subject determination unit 109.

Figure 3A:
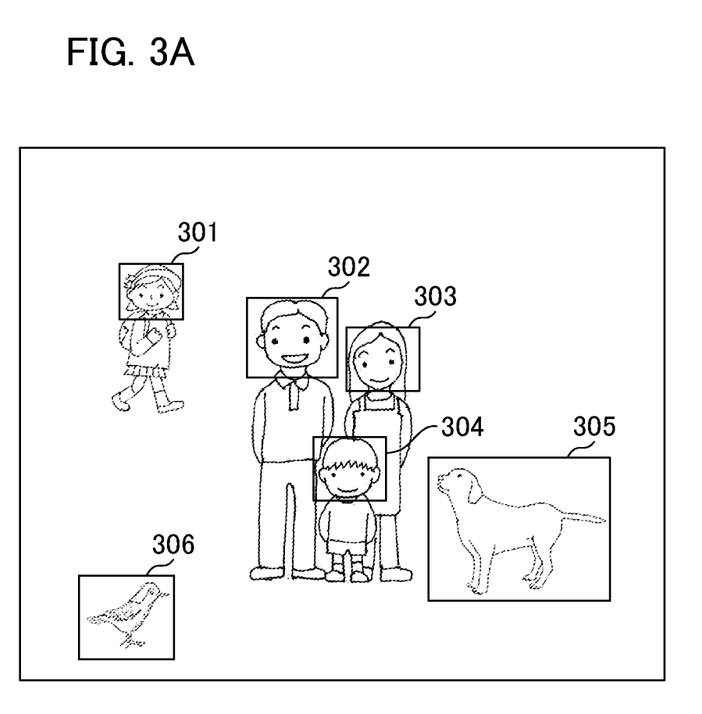
FIGS. 3A and 3B are diagrams illustrating subjects detected by a subject detection unit 108 and subject detection information.
Figure 3B:
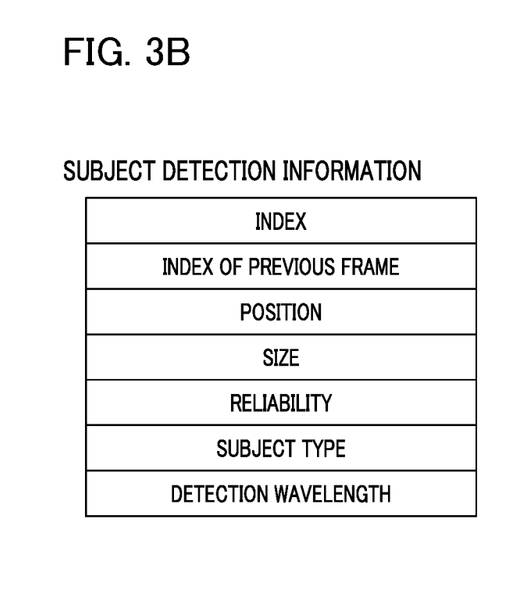

FIGS. 3A and 3B are diagrams illustrating subjects detected by the subject detection unit 108 and subject detection information, and will be described in detail with reference to FIG. 3. FIG. 3A is a diagram illustrating a case where a plurality of subjects are present in an angle of view. Subjects 301 to 304 are people, 305 denotes a dog, and 306 denotes a bird.

The subject detection unit 108 gives subject detection information illustrated in FIG. 3B to the angle of view. Here, an index of each subject, an index associated when the same subject is present in the previous frame, a detected coordinate position, and a size including width and height information are given.

The detection reliability of each subject and the type of subject are given. For the detection reliability, reliability is lowered and output for a frame in which the back or side faces with respect to an identification rate of detection which is obtained based on machine learning or the detection of a front-faced subject. Type information of the subject is information on the types of detected subjects such as a person, a dog, and a bird indicated by the subjects 301 to 306 described above. In addition, part information of the type to be detected such as the pupil part, the whole face, the side face, or the head is also added.

When the subject detection thereof is performed by machine learning, detection is performed based on learning data referred to as dictionary data corresponding to an object to be detected. Since a huge subject detector is required to cope with a plurality of subject types in one detection, it is possible to cope with a plurality of object types by using a relatively small subject detector by performing detection processing in a time-division manner using a plurality of pieces of dictionary data.

That is, the amount of processing is reduced by determining the type of subject (subject type determination) and switching dictionary data of the subject based on a determination result.

As detection information, whether an image used for detection has been obtained from a non-visible light image or a visible light image is given as detection wavelength information. Although the non-visible light image is acquired through the IR filter, and the visible light image is acquired through the R, G, and B filters in the first embodiment, the wavelength of the non-visible light image is not necessarily one wavelength.

For example, as an arrangement pattern of pixel units, pixel units for near-infrared rays, pixel units for far-infrared rays, pixel units for ultraviolet rays, and the like are disposed periodically, and detection processing may be performed on images generated for each wavelength.

In the first embodiment, the subject detection unit 108 performs detection processing on both a visible light image and a non-visible light image at the stage of processing some images for generating a multiple exposure image. Then, the detection subject determination unit 109 previously determines which of the visible light image and the non-visible light image has higher reliability of subject detection.

Thereafter, subject detection processing is performed again based on a finally obtained composite image (multiple exposure image). In this case, based on a reliability determination result of the detection subject determination unit 109, subject detection is performed based on either a visible light composite image (multiple exposure image) or a non-visible light composite image (multiple exposure image).

When a subject is detected based on some images for generating a multiple exposure image, it is desirable to use a dictionary that is used when detecting the subject based on a composite image, but a processing load increases. Thus, when speed and power are prioritized over accuracy, detection processing may be performed using a reduced image when performing subject detection based on some images for generating a multiple exposure image.

The detection subject determination unit 109 selects a wavelength during subject detection based on a composite image (multiple exposure image) on the basis of subject information detected from some visible light images and non-visible light images for generating the multiple exposure image, and notifies a system control unit, which is not illustrated in the drawing, of the selected wavelength. The image shift amount calculation unit 110 is notified of the region of a main subject detected based on the composite image (multiple exposure image). The image shift amount calculation unit 110 performs distance measurement on the region of the main subject which is notified of.

In the detection subject determination unit 109 of the first embodiment, the reliability of the subject detected from the visible light image and the (average value of) reliability of the subject detected from the non-visible light image are calculated and compared, and an image (visible light image or non-visible light image) of a wavelength with a higher (average value of) reliability is selected. The average value may be, for example, an average value for a plurality of frames, or in the case of visible light, the average value may be an average of the degrees of reliability of subjects detected from an R plane, a G plane, and a B plane.

The selection of a subject detection wavelength for a composite image does not necessarily have to be determined by comparing the degrees of reliability (or their averages). For example, an image of a wavelength in which more subjects are detected may be selected. Alternatively, an image of a wavelength in which a subject of a type instructed by a user interface, which is not illustrated in the drawing, is detected may be selected.

The image shift amount calculation unit 110 calculates an image shift amount between the A image and the B image based on the A image and the B image that are output from the capture unit 104. Then, the lens driving control unit 111 converts the image shift amount into a defocus amount, and drives the focus lens of the optical system unit 101 so that the defocus amount decreases.

The image shift amount between the A image and the B image is obtained by dividing the plurality of unit pixel cells arranged in a two-dimensional matrix illustrated in FIG. 2B into NM (N and M are integers) rectangular regions and performing computing for each of the separate rectangular regions.

The rectangular regions used for the above-described computation are determined in accordance with the output of the detection subject determination unit 109 in the previous frame. The position where a subject is present may be selected from distance measurement computation results of the obtained N×M rectangular regions based on the coordinates of a distance measurement region in the current frame.

By performing control in this manner, it is possible to rapidly perform lens driving control without waiting for the processing of the subject detection unit 108 in the current frame. The range and position of the distance measurement region are determined in accordance with the output of the detection subject determination unit 109.

Figure 4:
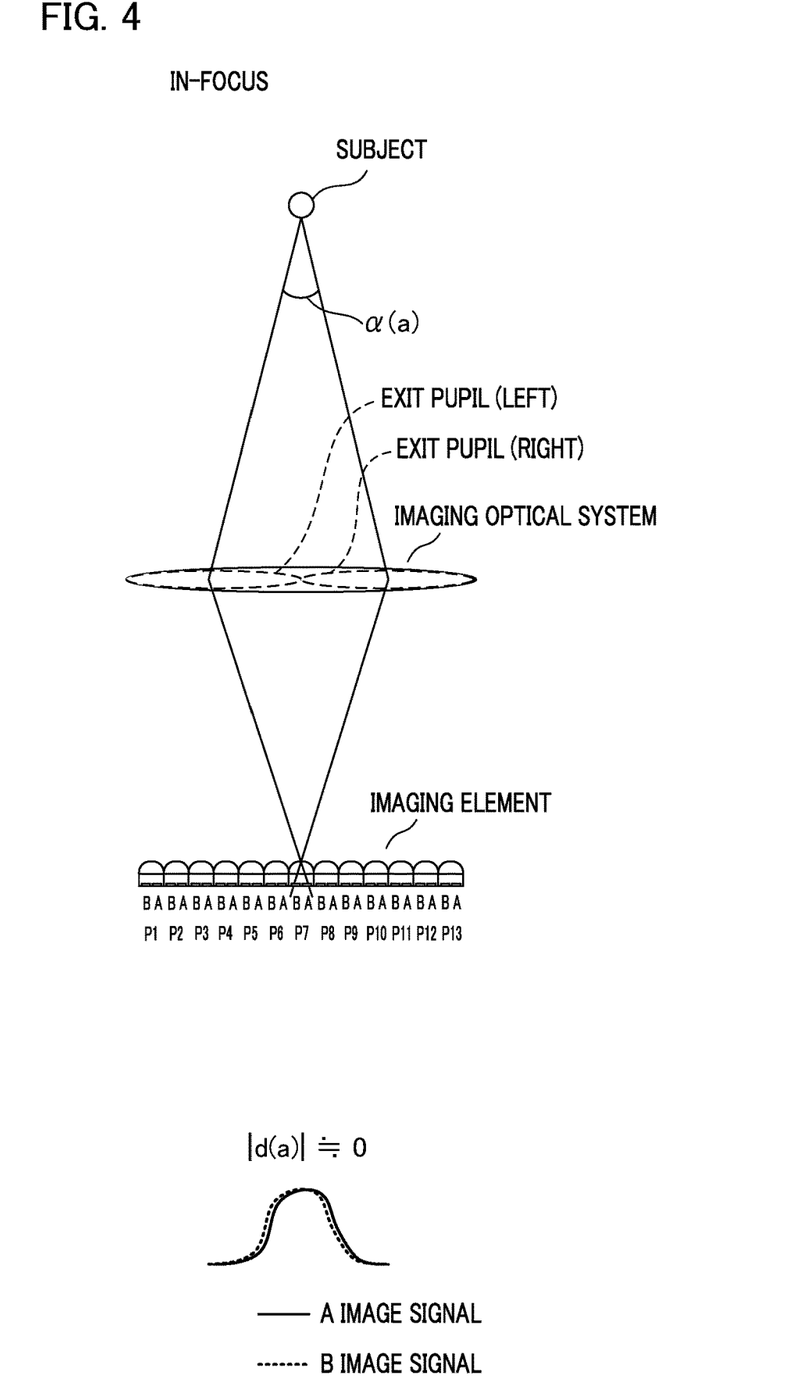
FIG. 4 is a diagram illustrating an image forming position in a focus state.

Here, the principle of focus detection using a phase difference will be described using FIGS. 4 to 6. FIG. 4 is a diagram illustrating an image forming position in an in-focus state, FIG. 5 is a diagram illustrating an image forming position in a front focus state, and FIG. 6 is a diagram illustrating an image forming position in a rear focus state.

Figure 5:
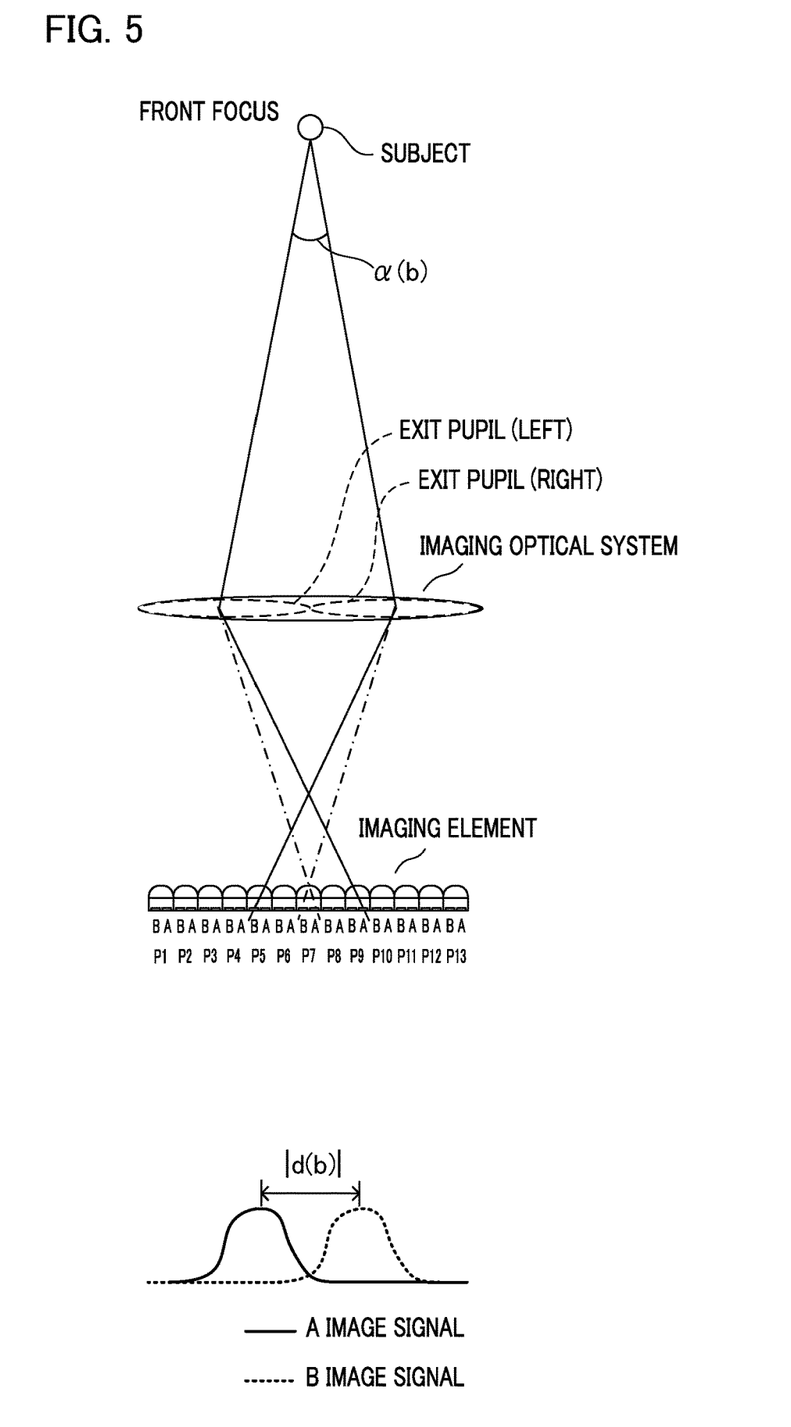
FIG. 5 is a diagram illustrating an image forming position in a front focus state.
Figure 6:
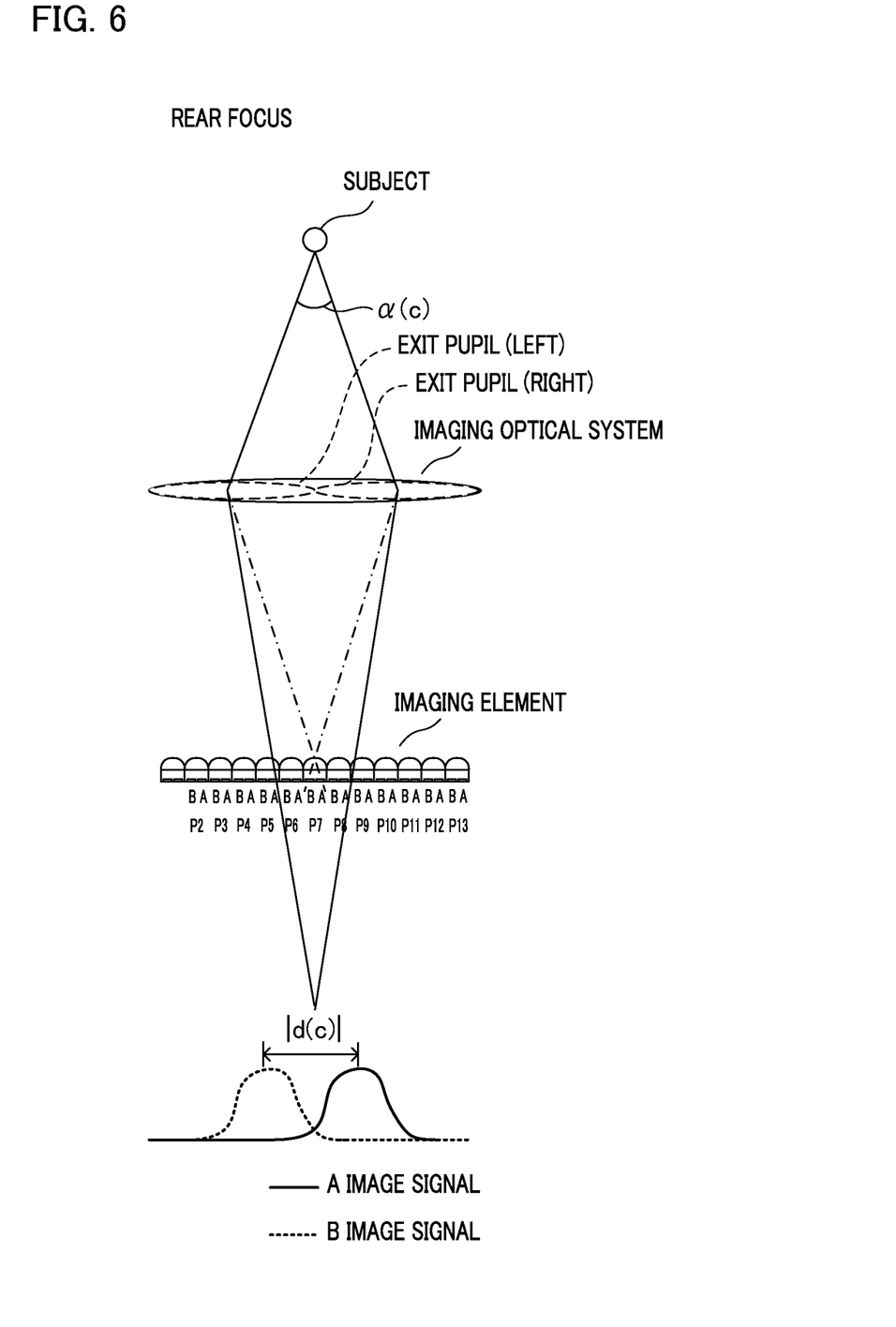
FIG. 6 is a diagram illustrating an image forming position in a rear focus state.

Imaging elements in FIGS. 4 to 6 have unit pixel cells disposed to have the structure illustrated in FIG. 2A. In FIG. 4, for example, 13 pixels disposed in the horizontal scanning direction are exemplified by P1 to P13. Pixels 1a and 1b of the unit pixel cell are shown as pixels A and B, respectively.

As illustrated in FIG. 4, a plurality of unit pixel cells P each having two pixels A and B separately disposed below one microlens are disposed. The pixels A and B disposed below the microlens function as so-called pupil-divided pixels that receive light from different exit pupils of an imaging optical system.

During distance measurement, signals of the A image which are output from the plurality of pixels A and signals of the B image which are output from the plurality of pixels B are acquired for each of the same colors. Then, a phase shift between each pixel signal $YAn$ of the A image and each pixel signal $YBn$ of the B image is obtained by SAD computation (correlation computation) for each color. A result of the SAD computation is obtained by Equation 1 below.

$$C = \Sigma |YAn - YBn| \qquad \text{(Equation 1)}$$

At this time, n is the number of pixel units in a range for performing SAD computation in the horizontal scanning direction. The SAD computation is performed while shifting phases of the A image signal and the B image signal by one pixel unit, and a phase shift amount when the SAD computation value is the smallest corresponds to a defocus amount.

As illustrated in FIG. 4, in the case of in-focus, an image forming position of the imaging optical system is the position of PD below the P7 microlens, and thus the phase of the A image signal obtained from an A image pixel group and the phase of the B image signal obtained from a B image pixel group are substantially the same. At this time, an image shift amount d(A) between the A image pixel group and the B image pixel group obtained by correlation computation is substantially zero.

As illustrated in FIG. 5, in the case of front focus, an image forming position of the imaging optical system is in front of the light receiving surface of the imaging element. Thus, in the light from the subject, light that has passed through the center of the exit pupil on the right side of the imaging optical system in FIG. 5 is incident on the pixel A of P5, and in light from the subject, light that has passed through the center of the exit pupil on the left side of the imaging optical system in FIG. 5 is incident on the pixel B of P9. At this time, an image shift amount d(b) occurs as a phase difference between the A image signal and the B image signal obtained by the correlation computation.

On the other hand, as illustrated in FIG. 6, in the case of rear focus, an image forming position of the imaging optical system is behind the light receiving surface of the imaging element. Thus, in the light from the subject, light that has passed through the center of the exit pupil on the right side of the imaging optical system in FIG. 6 is incident on the pixel A of P9, and in the light from the subject, light that has passed through the center of the exit pupil on the left side of the imaging optical system in FIG. 6 is incident on the pixel B of P5.

At this time, an image shift amount d(c) occurs as a phase difference between the A image signal and the B image signal obtained by the correlation computation. The image shift amount d(c) has a phase difference in the direction opposite to the image shift amount d(b).

This indicates that the A image pixel group and the B image pixel group respectively view the same subject during focusing, but the A image pixel group and the B image pixel group view the subjects shifted by an image shift amount d during front focusing and rear focusing. In this manner, it is possible to obtain a defocus amount based on the image shift amount d at which a correlation computation result has a minimum value and a baseline length, and perform a focusing operation on the subject.

Figure 7:
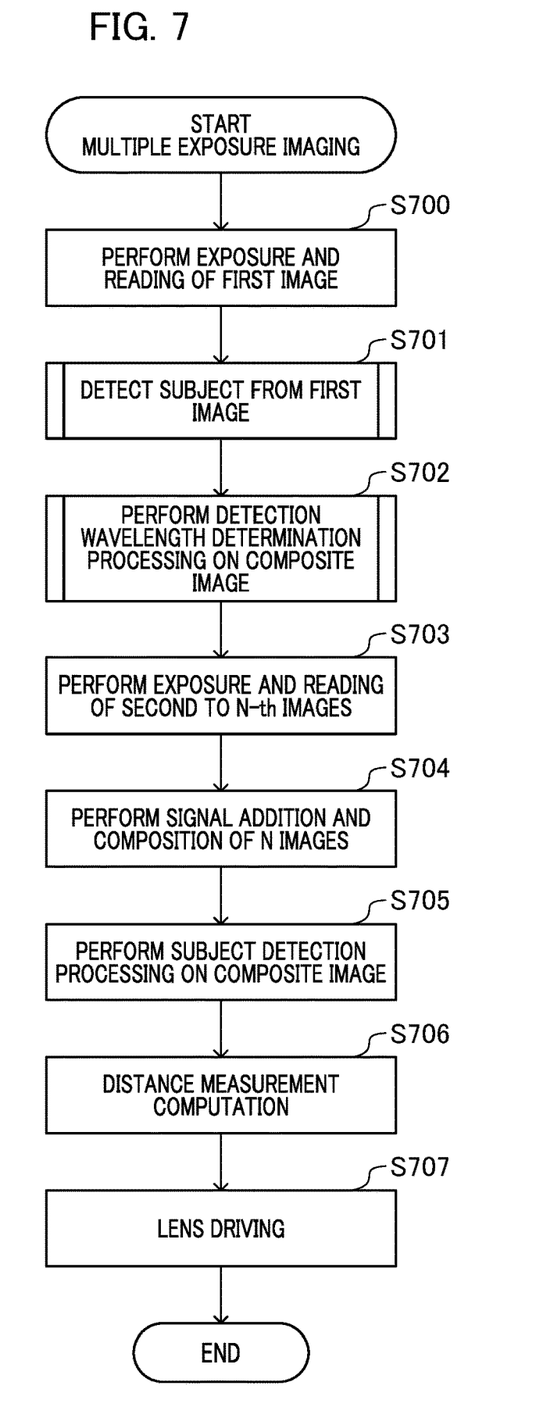
FIG. 7 is a flowchart related to multiple exposure of the imaging device 100 according to the first embodiment.

FIG. 7 is a flowchart related to multiple exposure of the imaging device 100 according to the first embodiment. The operation of each step in the flowchart of FIG. 7 is performed by causing the computer in the imaging device 100 to execute a computer program stored in the memory. Operations from when exposure starts to when the lens driving control unit 111 completes lens driving during multiple exposure imaging of the imaging device 100 will be described with reference to FIG. 7.

In step S700, a first image for generating a multiple exposure image is read from the imaging element 102 and stored in the volatile memory M via the inter-frame signal addition unit 105. An image is input to the subject detection unit 108, and the processing proceeds to step S701.

In step S701, the subject detection unit 108 performs subject detection based on a visible light image among the frame images input from the inter-frame signal addition unit 105 and a non-visible light image corresponding to the IR color filter among the frame images stored in the volatile memory M. Then, the detected subject information is output to the detection subject determination unit 109, and the processing proceeds to step S702.

Figure 8:
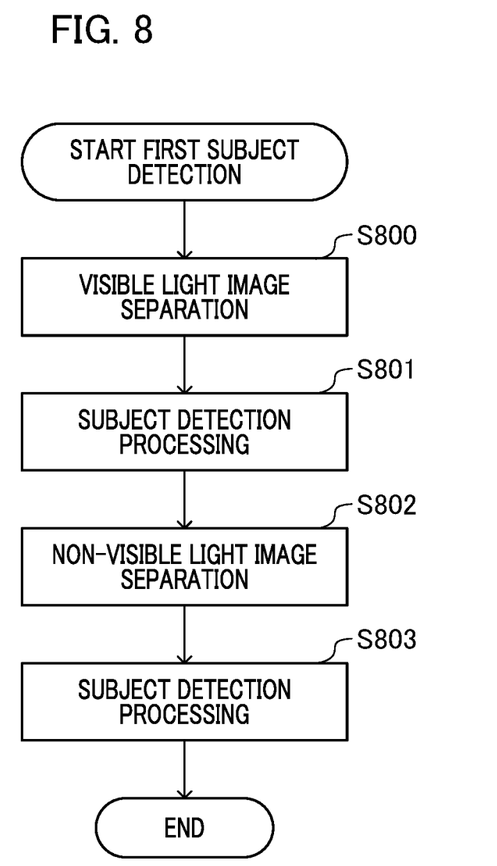
FIG. 8 is a flowchart illustrating sub-processes of step S701 of FIG. 7.

FIG. 8 is a flowchart illustrating sub-processes of step S701 of FIG. 7, and the sub-processes of step S701 will be described using the flowchart of FIG. 8. The operation of each step in the flowchart of FIG. 8 is performed by causing the computer in the imaging device 100 to execute the computer program stored in the memory.

In step S800, the subject detection unit 108 separates signals of pixel units corresponding to RGB visible light from the input frame image and performs synchronization to generate R-plane, G-plane, and B-plane visible light images.

In step S801, the subject detection unit 108 performs subject detection based on the input R-plane, G-plane, and B-plane visible light. The subject detection unit 108 is notified of it, and the processing proceeds to step S802. Here, step S801 functions as a first detection step (first detection unit) of detecting a subject based on the output of the visible light pixels before the generation of a composite image signal is completed.

In step S802, the subject detection unit 108 reads the frame images stored in the volatile memory M, separates the signals of the pixel units corresponding to the IR filters from the read frame images, and generates a non-visible light image. Then, the processing proceeds to S803.

Then, in step S803, the subject detection unit performs subject detection based on the input non-visible light image. The subject detection unit 108 is notified of it. The flowchart in FIG. 8 is terminated, and the processing proceeds to step S702.

Here, step S803 functions as a second detection step (second detection unit) of detecting a subject based on the output of the non-visible light pixels before the generation of a composite image signal is completed.

In the first embodiment, subject detection processing is performed based on a non-visible light image after a subject is detected based on a visible light image, but the order is not limited thereto. The first embodiment can be applied regardless of the order of processing of detection target images.

Next, in step S702, the detection subject determination unit 109 selects a detection wavelength band for detecting a subject in a composite image based on the subject information output from the subject detection unit 108. Then, the processing proceeds to step S703.

Figure 9:
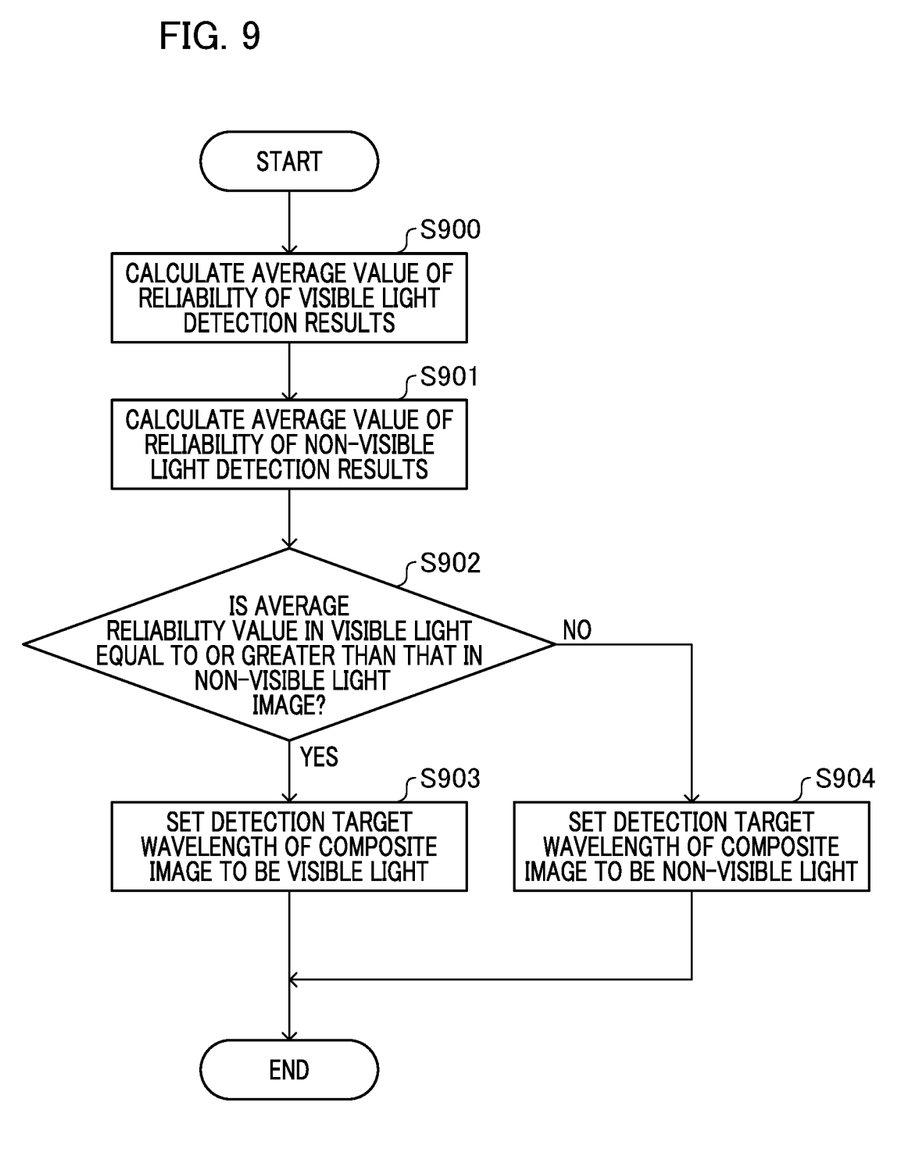
FIG. 9 is a flowchart illustrating sub-processes of step S702 of FIG. 7.

FIG. 9 is a flowchart illustrating sub-processes of step S702 in FIG. 7, and the sub-processes of step S702 will be described using FIG. 9. The operation of each step in the flowchart of FIG. 9 is performed by causing the computer in the imaging device 100 to execute a computer program stored in the memory.

In step S900, the detection subject determination unit 109 obtains an average value of the reliability of a detected subject obtained from a visible light image, and the processing proceeds to step S901. In step S901, the detection subject determination unit 109 obtains an average value of the reliability of a detected subject obtained from a non-visible light image, and the processing proceeds to step S902.

In step S902, the detection subject determination unit 109 determines an image of a wavelength with a higher average value of the reliability of a detected subject. That is, when the average value of the reliability of the detected subject in the visible light image is equal to or greater than the average value of the reliability of the detected subject in the non-visible light image, the processing proceeds to step S903, and otherwise, the processing proceeds to step S904.

In step S903, the detection subject determination unit 109 sets a detection wavelength of a subject in a composite image to be visible light, and the flowchart is terminated. In step S904, the detection subject determination unit 109 sets the detection wavelength of the subject in the composite image to be non-visible light, the flowchart of FIG. 9 is terminated, and the processing proceeds to step S703.

Next, in step S703, the imaging element 102 reads second to N-th image data forming a multiple exposure image, and the processing proceeds to step S704. In step S704, the inter-frame signal addition unit 105 adds up a total of N pieces of image data, that is, the first to N-th image data forming the multiple exposure image, and the processing proceeds to step S705. Here, step S704 functions as a composite image generation step of combining a plurality of image signals to generate a composite image signal.

In step S705, the subject detection unit 108 selects an image (visible light composite image or non-visible light composite image) of a detection target wavelength in accordance with the wavelength set in step S702, performs subject detection processing, and detects a main subject region.

In this manner, in steps S702 to S705, subject detection is performed using either the visible light image or the non-visible light image included in the composite image signal based on a comparison result for the reliability between the outputs in the first detection step and the second detection step. Steps S702 to S705 function as a third detection step (third detection unit) that performs the above-described processing.

Then, the position and size of the main subject region detected in step S705 are output to the image shift amount calculation unit 110, and the processing proceeds to step S706. When a plurality of subjects are detected, for example, a subject closest to the center of the image or a subject closest to the imaging device is assumed to be a main subject, and a distance measurement region for performing distance measurement on the main subject is set.

In step S706, the image shift amount calculation unit 110 performs distance measurement computation by calculating an image shift amount in the distance measurement region set by the detection subject determination unit 109, and the processing proceeds to step S707. In step S707, the lens driving control unit 111 calculates a defocus amount based on the image shift amount and drives the optical system unit 101 to reduce the defocus amount to thereby achieve focusing, and the flowchart of FIG. 7 is terminated.

In the flowchart of FIG. 7, subject detection is performed based on the first image, but it is not always necessary to perform subject detection based on the first image. For example, subject detection may be performed using, for example, the second and subsequent images or a middle image during a multiple exposure period.

Further, in the flowchart of FIG. 7, subject detection is performed based on the output of the capture unit 104, but subject detection may be performed based on an image read from the volatile memory M during image composition. By performing such processing, it is possible to detect an image with a high S/N ratio.

Figure 10:
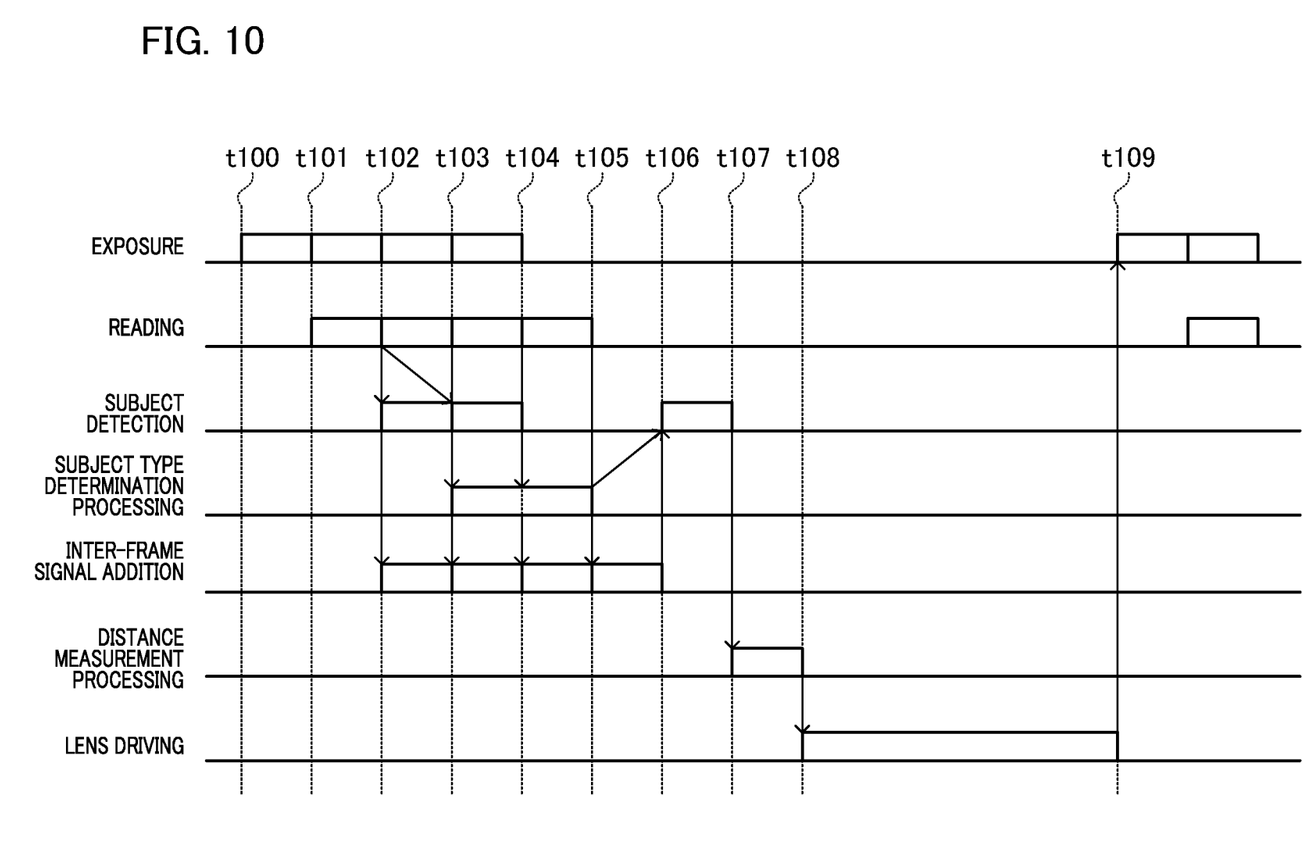
FIG. 10 is a timing chart illustrating operations related to distance measurement of the imaging device 100 to which the first embodiment is applied.

FIG. 10 is a timing chart illustrating operations related to distance measurement of the imaging device 100 to which the first embodiment is applied, and a sequence from exposure to lens driving control of the imaging device 100 will be described using FIG. 10. For convenience of description, in the timing chart of FIG. 10, an example in which multiple exposure image signals are combined using image signals of four frames will be described.

From time t100 to time t101 (one frame period), the imaging element 102 performs a first exposure operation on an image formed by the optical system unit 101. This exposure operation controls a charge accumulation period by controlling a charge accumulation operation in the imaging element, but the exposure period may be controlled using a shutter. The exposure period (charge accumulation period) may be a portion of the time t100 to time t101.

At time t101, the imaging element 102 completes the exposure operation, starts an operation of performing reading from the imaging element 102, and acquires signals via the A/D conversion unit 103 and the capture unit 104. An exposure operation for the next (second) image forming the multiple exposure image is started from time t101.

At time t102, the reading of the first image (first frame) is completed, and the inter-frame signal addition unit 105 stores the first image for which reading has been completed in the volatile memory M. The subject detection unit 108 separates the visible light image to generate R-plane, G-plane, and B-plane images, and starts subject detection processing.

The imaging element 102 starts to read the second image for generating the multiple exposure image, starts to acquire the second image data via the capture unit 104, and starts to expose the third image for generating the multiple exposure image from time t102.

At time t103, the inter-frame signal addition unit 105 adds up the second image for which reading has been completed and the first image stored in the volatile memory M, and stores the added-up images in the volatile memory M. The imaging element 102 starts to read the third image for generating the multiple exposure image, starts to acquire it via the capture unit 104, and starts to expose the fourth image for generating the multiple exposure image.

The subject detection unit 108 outputs a subject detection result based on the visible light image to the detection subject determination unit 109 at time t103. On the other hand, a non-visible light image is separated from the first image stored in the volatile memory M, and subject detection based on the non-visible light image is started at time t103.

The detection subject determination unit 109 starts subject type determination processing based on the detection result obtained from the visible light image. That is, the detection subject determination unit 109 determines a subject type and switches dictionary data for subject detection based on a determination result.

At time t104, the reading of the third image is completed, and the inter-frame signal addition unit 105 adds the third image for which reading has been completed to the inter-frame addition image stored in the volatile memory M, and stores the added-up images in the volatile memory M. Further, at time t104, the imaging element 1021 starts to read the fourth image forming the multiple exposure image, and starts to acquire it via the capture unit 104.

At time t104, the subject detection unit 108 completes the subject detection based on the non-visible light image and notifies the detection subject determination unit 109 of the completion of the subject detection. As described above, the subject type determination processing in the detection subject determination unit 109 starts from time t103.

At time t105, the reading of the fourth image is completed, and the inter-frame signal addition unit 105 adds the fourth image for which reading has been completed to the inter-frame addition image stored in the volatile memory M to start to generate a fourth multiple exposure image. At approximately the same timing, the subject type determination processing in the detection subject determination unit 109 is completed, and a subject detection wavelength in the composite image is selected.

At time t106, the generation of the four multiple exposure images is completed, and a multiple exposure image (composite image) is generated by multiplexing a plurality of frames of frame images including visible light and non-visible light. At time t106, the subject detection unit 108 starts subject detection based on the composite image of visible light or non-visible light based on the selection in the subject type determination processing.

At time t107, the subject detection unit 108 completes subject detection based on the composite image of visible light or non-visible light, and notifies the image shift amount calculation unit 110 of a distance measurement region corresponding to the position and size of a subject. Then, the image shift amount calculation unit 110 starts the distance measurement processing for that distance measurement region from time t107.

At time t108, the image shift amount calculation unit 110 completes the distance measurement processing, and the lens driving control unit 111 starts to drive the focus lens of the optical system unit 101. When the driving of the focus lens of the optical system unit 101 is completed at time t109, exposure control for the first multiple exposure image is started again similar to time t100. Thereafter, the operation at time t101 and the subsequent operations are repeated.

Thus, in the first embodiment, subject detection based on the visible light image and the non-visible light image is executed during the period from time t102 to time t104 before time t105. Thus, a composite image for performing subject detection in the final composite image is selected from the composite image of visible light or the composite image of non-visible light with reference to some images during multiple exposure while reducing a detection time to ½.

Thus, it is possible to perform subject detection with high accuracy. That is, it is possible to perform subject detection processing of a multiple exposure image with high accuracy and at high speed.

For convenience of description, the timing chart in FIG. 10 shows that the next processing starts after each processing is completed, but some of the processing may be executed in parallel. Although the first embodiment adopts a configuration in which a non-visible light image is detected after a visible light image is detected, the order of detection is not limited thereto.

In the first embodiment, subject detection processing is performed on a first image for which division exposure is performed, but the exposure timing of a detection target is not limited to the first image. For example, as described above, a read image with exposure closest to an exposure center timing of a multiple exposure image may be used as a target image for subject detection.

In the first embodiment, detection processing is performed on an exposure image for generating a multiple exposure image, but the detection processing may be performed based on an added image in the middle of composition. For example, detection processing may be performed on a result of adding first and second images, or detection processing may be performed on a result of integrating a third image.

That is, a subject may be detected based on each of the output of a visible light pixel and the output of a non-visible light pixel in a composite image before the generation of a composite image signal is completed. In this case, a subject may be detected based on each of the output of a visible light pixel (first pixel) and the output of a non-visible light pixel (second pixel) in composite images at different timings before the generation of a composite image signal is completed.

When subject detection based on a visible light image and subject detection based on a non-visible light image are completed before the output of a final composite image, it is possible to reduce a detection processing time for the final composite image and to obtain the effects of the first embodiment.

Second Embodiment

In the first embodiment, description has been given of an operation of performing processing at high speed in a case where subject detection is performed again in a multiple exposure image based on subject detection using a visible light image and a non-visible light image obtained at the same division exposure timing.

That is, in the first embodiment, the first detection unit and the second detection unit detect a subject based on the output of a visible light pixel (first pixel) and the output of a non-visible light pixel (second pixel) obtained by the same exposure, respectively. However, a second embodiment is not necessarily limited to detecting a subject based on visible light and non-visible light images obtained at the same division exposure timing.

In the second embodiment, description will be given of an imaging device capable of reducing the amount of access to a volatile memory M and a region used for an image compared to the first embodiment by setting different division exposure timings for acquiring visible light and non-visible light images.

That is, in the second embodiment, a first detection unit and a second detection unit detect a subject based on the output of a visible light pixel (first pixel) and the output of a non-visible light pixel (second pixel) obtained by different exposures, respectively.

Figure 11:
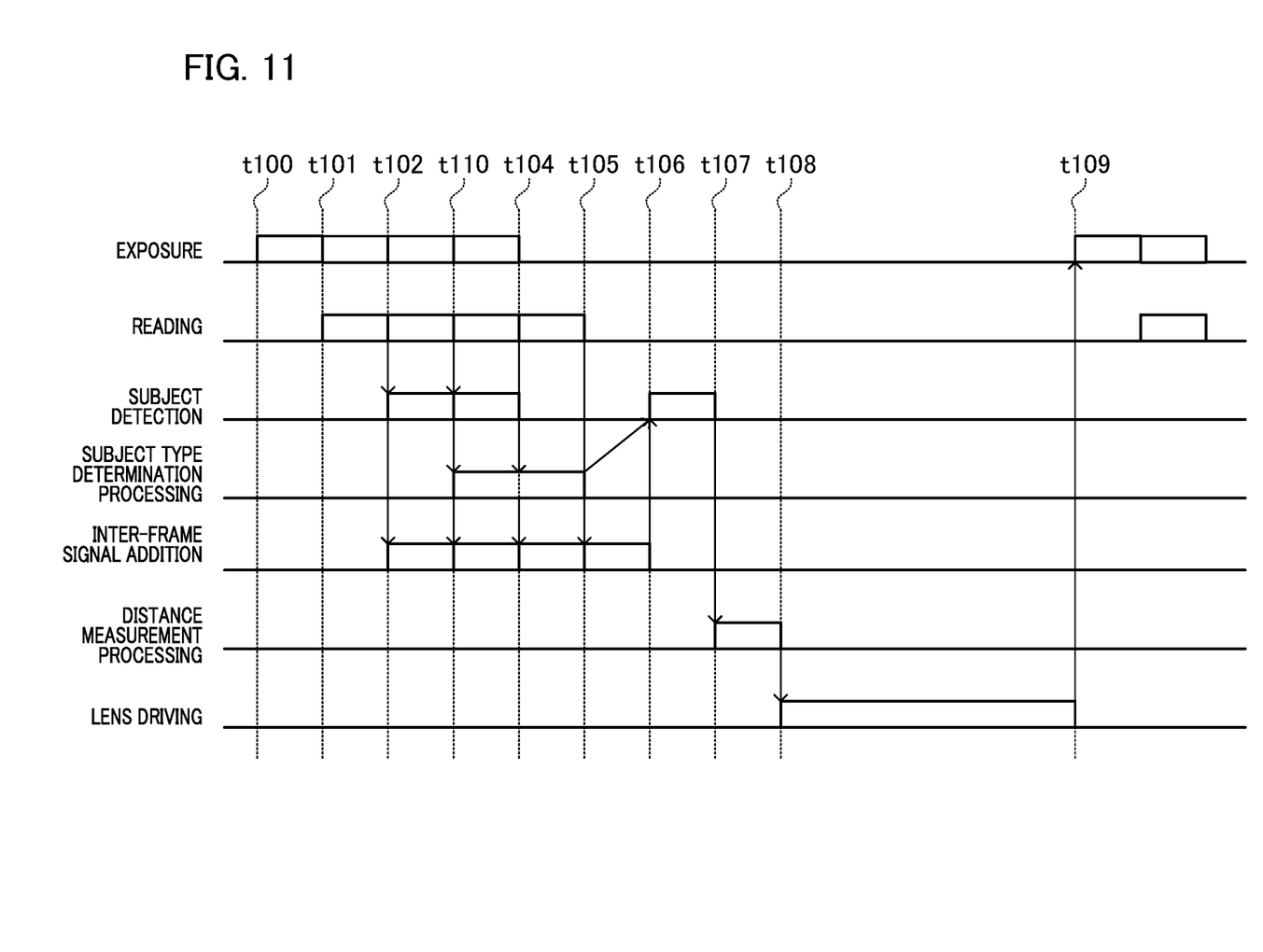
FIG. 11 is a timing chart illustrating operations related to distance measurement of an imaging device 100 according to a second embodiment of the present invention.

FIG. 11 is a timing chart illustrating operations related to distance measurement of an imaging device 100 according to the second embodiment of the present invention, and the imaging device in the second embodiment will be described using FIG. 11. The timing chart of FIG. 11 corresponds to the timing chart of FIG. 10 described in the first embodiment. It is assumed that the same processing is performed at the time with the same number as in FIG. 10, and the description is omitted.

At time t110, an inter-frame signal addition unit 105 adds up a second image for which reading has been completed and a first image stored in the volatile memory M, and writing-back is performed in the region of the volatile memory M where the first image is stored.

At time t110, an imaging element 102 starts to expose a fourth image for generating the multiple exposure image while reading a third image for generating the multiple exposure image via a capture unit 104.

Furthermore, a subject detection unit 108 outputs a detection result for a visible light image to a detection subject determination unit 109, separates a non-visible light image from the second image for which reading has been completed, and starts subject detection based on the non-visible light image. The detection subject determination unit 109 starts subject type determination processing based on the detection result obtained from the visible light image.

By writing back the result of frame addition in the first image region read from the volatile memory M in this manner, the limited capacity of the volatile memory M can be used efficiently. When the processing is not performed in this manner, it is necessary to store all divided exposure images for generating multiple exposure in the volatile memory M, and thus many storage regions need to be used.

When writing-back is performed as in the second embodiment, a divided exposure image at a timing when detection has been performed from a visible light image is not stored. Thus, it is possible to reduce the region of the volatile memory M to be used by performing subject detection by separating a non-visible light image from the sequentially read divided exposure images. Since it is possible to perform subject detection without reading a non-visible light image from the volatile memory M, the amount of access to the volatile memory M can be reduced.

In the second embodiment, subject detection is performed by separating a non-visible light image from divided exposure images sequentially read from the imaging element in order to reduce a storage region, but the present invention is not limited thereto. For example, at time t110, the inter-frame signal addition unit 105 may separate a visible light image from images read from the volatile memory M and detect a subject. Then, at time t104, the inter-frame signal addition unit 105 may separate a non-visible light image from images read from the volatile memory M and detect a subject.

While the present invention has been described with reference to exemplary embodiments, it is to be understood that the invention is not limited to the disclosed exemplary embodiments. The scope of the following claims is to be accorded the broadest interpretation to encompass all such modifications and equivalent structures and functions.

In addition, as a part or the whole of the control according to the embodiments, a computer program realizing the function of the embodiments described above may be supplied to the imaging device through a network or various storage media. Then, a computer (or a CPU, an MPU, or the like) of the imaging device may be configured to read and execute the program. In such a case, the program and the storage medium storing the program configure the present invention.

The present invention includes, for example, those implemented using at least one processor or circuit configured to function as the imaging devices of the embodiments described above. Note that distributed processing may be performed using a plurality of processors.

This application claims the benefit of Japanese Patent Application No. 2022-169254, filed on Oct. 21, 2022, which is hereby incorporated by reference herein in its entirety.

What is claimed is:

1. An imaging device comprising:
   an imaging unit having a first pixel that photoelectrically converts visible light and a second pixel that photoelectrically converts non-visible light to generate image signals,
   at least one processor or circuit configured to function as:
   a composite image generation unit configured to generate a composite image signal by combining a plurality of the image signals,
   a first detection unit configured to detect a subject based on an output of the first pixel before the generation of the composite image signal is completed,
   a second detection unit configured to detect a subject based on an output of the second pixel before the generation of the composite image signal is completed, and
   a third detection unit configured to perform subject detection using an output of either a visible light image or a non-visible light image included in the composite image signal based on an output of the first detection unit and an output of the second detection unit.

2. The imaging device according to claim 1, wherein the first detection unit and the second detection unit detect the subject respectively based on the output of the first pixel and the output of the second pixel obtained by the same exposure.

3. The imaging device according to claim 1, wherein the first detection unit and the second detection unit detect the subject respectively based on the output of the first pixel and the output of the second pixel obtained by different exposures.

4. The imaging device according to claim 1, wherein the first detection unit and the second detection unit detect the subject respectively based on the output of the first pixel and the output of the second pixel in the composite image signal, before the generation of the composite image signal is completed.

5. The imaging device according to claim 1, wherein the first detection unit and the second detection unit detect the subject respectively based on the output of the first pixel and the output of the second pixel in the composite image signal at different timings, before the generation of the composite image signal is completed.

6. The imaging device according to claim 1, wherein the third detection unit performs subject detection using an output of either the visible light image or the non-visible light image included in the composite image signal based on a result of comparing the degrees of reliability of the output of the first detection unit and the output of the second detection unit.

7. An imaging method comprising:
   imaging using a first pixel photoelectrically converting visible light and a second pixel photoelectrically converting non-visible light to generate image signals;
   generating a composite image signal by combining a plurality of the image signals;
   detecting a subject based on an output of the first pixel before the generation of the composite image signal is completed;
   detecting a subject based on an output of the second pixel before the generation of the composite image signal is completed; and
   performing subject detection using an output of either a visible light image or a non-visible light image included in the composite image signal based on an output in the detecting of the subject based on the output of the first pixel and an output in the detecting of the subject based on the output of the second pixel.

8. A non-transitory computer-readable storage medium configured to store a computer program comprising instructions for executing following processes:
   imaging using a first pixel photoelectrically converting visible light and a second pixel photoelectrically converting non-visible light to generate image signals;

generating a composite image signal by combining a plurality of the image signals;

detecting a subject based on an output of the first pixel before the generation of the composite image signal is completed;

detecting a subject based on an output of the second pixel before the generation of the composite image signal is completed; and performing subject detection using an output of either a visible light image or a non-visible light image included in the composite image signal based on an output in the detecting of the subject based on the output of the first pixel and an output in the detecting of the subject based on the output of the second pixel.

* * * * *